Dec. 17, 1957 A. L. STEGNER 2,816,354
METHOD FOR ATTACHING AN ELECTRICAL CONDUCTOR
TO A BURIED METAL OBJECT
Filed Oct. 18, 1952 4 Sheets-Sheet 3
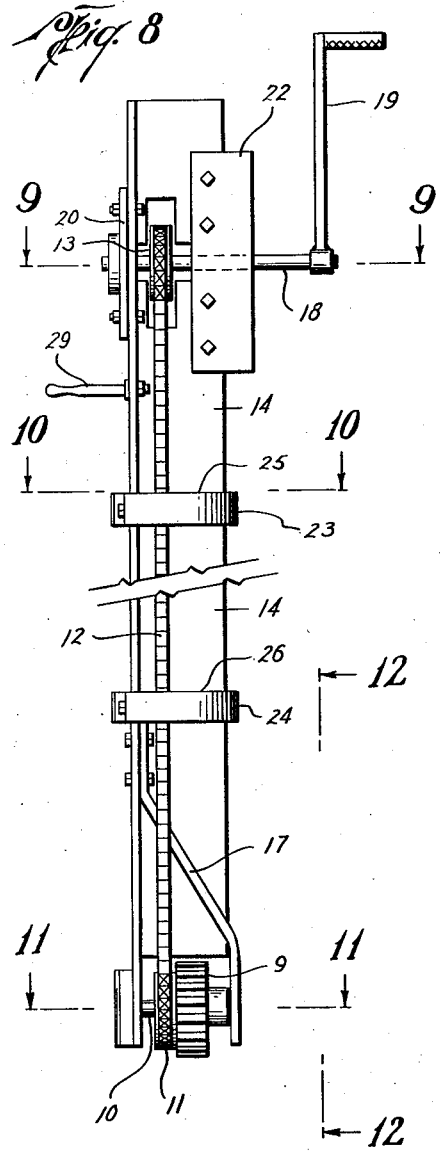
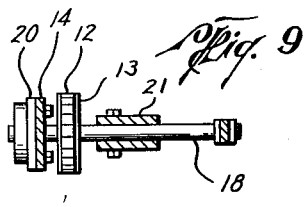
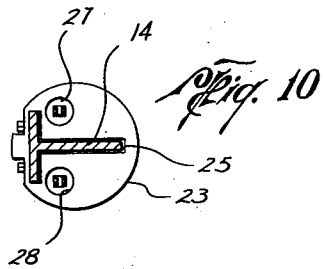
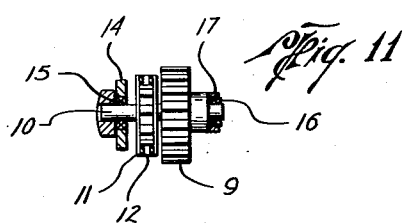
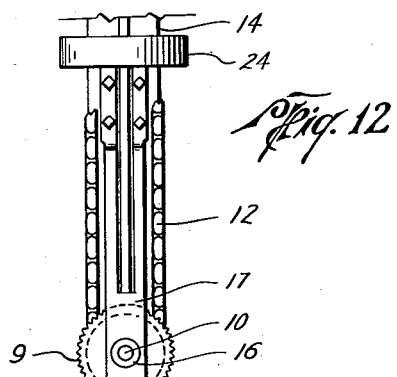
Albert L. Stegner
INVENTOR.
BY Frank B Pugsley
ATTORNEY Dec. 17, 1957   A. L. STEGNER   2,816,354
METHOD FOR ATTACHING AN ELECTRICAL CONDUCTOR
TO A BURIED METAL OBJECT
Filed Oct. 18, 1952   4 Sheets-Sheet 4
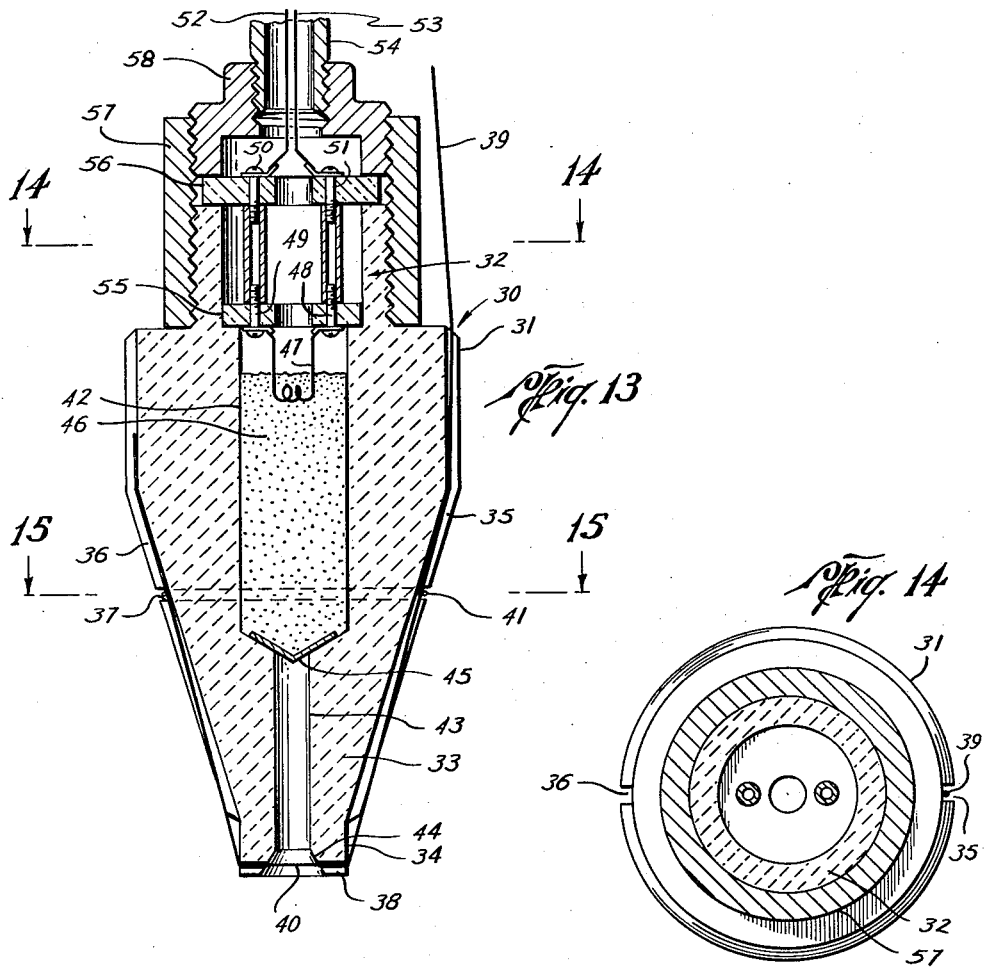
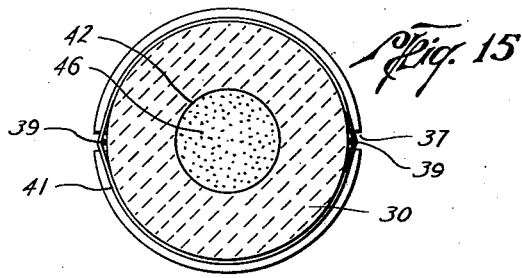
Albert L. Stegner
INVENTOR.
BY Frank B Pugsley
ATTORNEY United States Patent Office 2,816,354
Patented Dec. 17, 1957

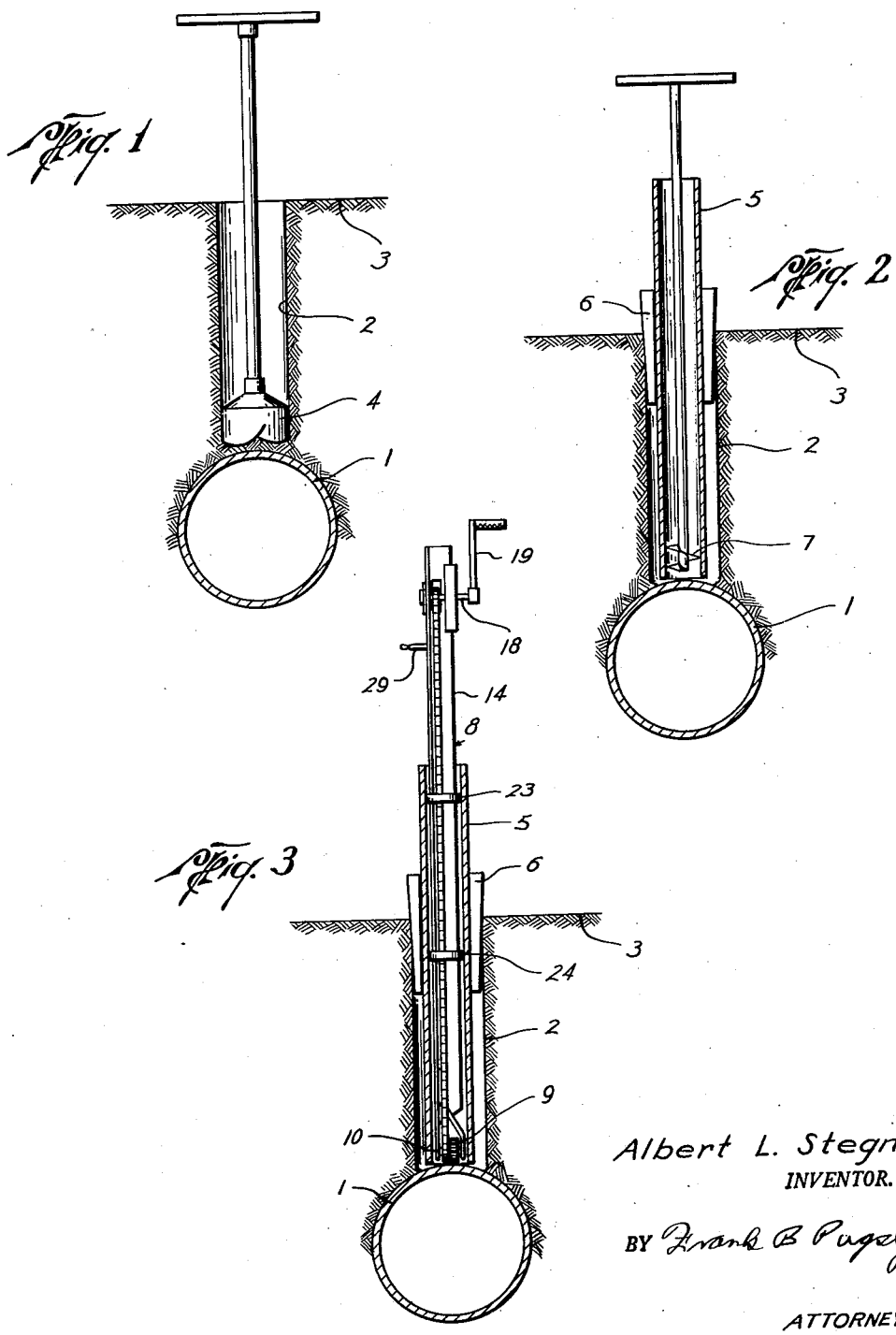

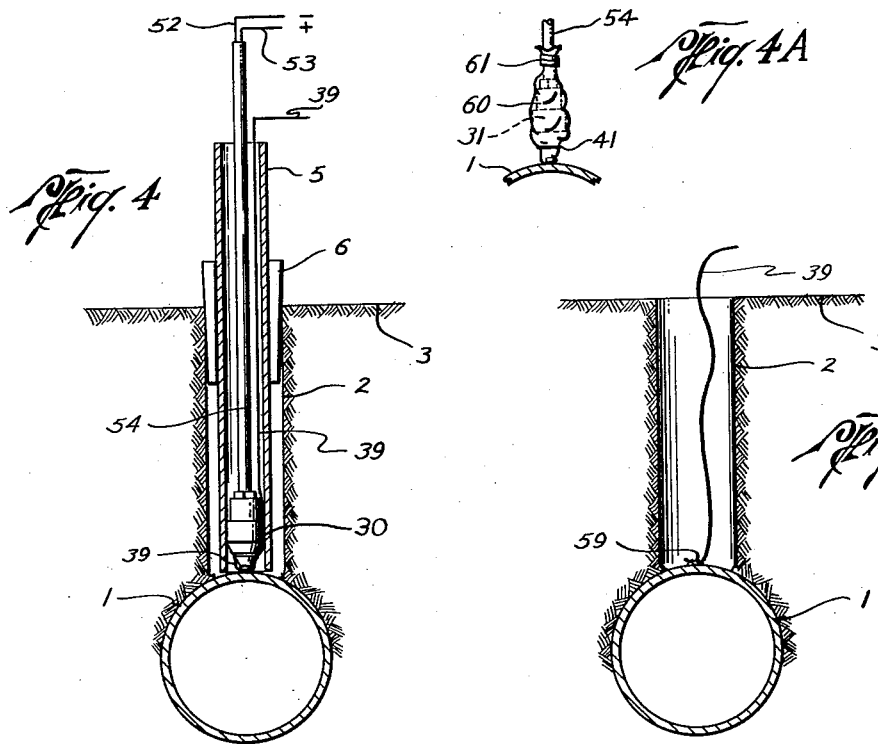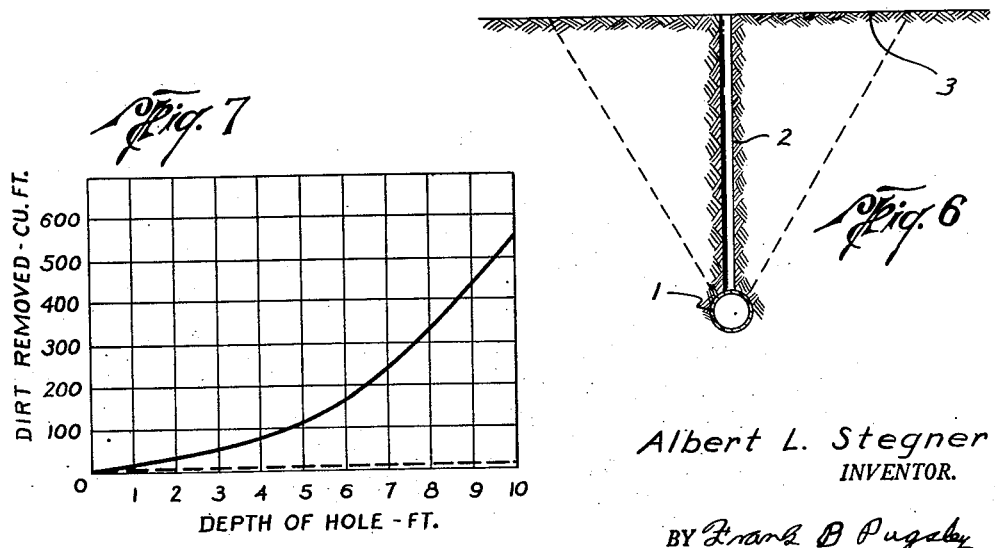

2,816,354

METHOD FOR ATTACHING AN ELECTRICAL CONDUCTOR TO A BURIED METAL OBJECT

Albert L. Stegner, Houston, Tex.

Application October 18, 1952, Serial No. 315,593

4 Claims. (Cl. 29—407)

This invention relates to a method and apparatus for attaching electrical conductors to buried metal objects and more particularly to a method and apparatus for attaching test leads to underground pipes such as gas or oil conduits.

It is frequently desirable and sometimes necessary to attach one end of each of several electrical conductors to a buried metal object in order to take electrical instrument readings, particularly in connection with corrosion control. In maintaining underground pipe lines, such as oil, gas or water lines, corrosion control is very important and test leads are attached and readings made at frequent intervals. These test leads are simply insulated small diameter wires attached, as by welding or soldering, to the pipe and extending above ground for ready attachment to the instruments. Heretofore, in order to install a test lead to an underground pipe it has been necessary to excavate a hole large enough to allow working space for a man at its bottom, and with a sufficiently large top opening to avoid the danger of the wall caving in. By way of illustration, to attach a test lead to a pipe 5 feet under ground would, by previous methods, require the excavation of approximately 100 cubic feet of dirt. Moreover, it has often been virtually impossible under conditions of wet or crumbling earth formations to successfully make a test lead installation.

Accordingly, it is an object of my invention to provide a method of making test lead installations without the necessity of extensive excavation.

Another object of my invention is to provide a method of making test lead installations whereby the test leads may be installed regardless of the condition or type of earth encountered.

In carrying out my invention in a presently preferred manner I drill a hole of small diameter relative to its depth from the ground level to the upper surface of the buried object, and then lower a casing therein, preferably until it makes contact with the upper surface of the object. To remove any residual dirt that may be inside the casing on top of the object I use a thin metal auger or the like with a diameter slightly smaller than the inside of the casing. It will be understood, of course, that this step may not always be necessary. If the surface of the pipe or other object is covered with a protective wrapper or coating, or is corroded, I lower in the casing a cleaning apparatus comprising an elongated frame carrying at its lower end a cutter or grinder operated either manually or automatically at ground level. This apparatus will clean an area on the surface of the pipe within the casing and, since the frame is adapted to be guided and positioned by the interior wall of the casing, the spot cleaned will be in a predetermined place relative to the casing axis. Preferably the frame guides are so arranged that the cleaned area will be in the center of the casing.

In order to attach the test lead I drop a welding device into the casing which preferably has attached to it the electrical conductor. This welding device either has a maximum diameter substantially as great as that of the inside of the casing or is provided with a centering collar so that its lower end will be guided by the casing and positioned directly above and adjacent the cleaned spot on the pipe. By suitable controls at ground level I ignite an exothermic type welding compound or other similar substance, which fuses, melts or otherwise destroys a retaining disc, and deposits itself on the pipe and test lead to attach the two securely together. The electrical conductor or test lead is releasably held to the welding device in such a manner that the welding device can be withdrawn from the casing, after depositing the weld metal, without disturbing the attached test lead.

If desired the weld may be covered with a suitable coating material, and the hole may be either filled with dirt or otherwise covered. Suitable electrical instrument readings can then be taken by attaching the instrument to the end of the test lead extending above ground with assurance that good contact has been made and will be maintained with the under-ground object. Moreover, by this method the amount of dirt removed to make a five foot deep hole with a six inch diameter auger, for example, is approximately one cubic foot as compared with the one hundred cubic feet required to excavate a conventional bell hole with sixty degree slope to the sides and large enough to permit a man to attach the lead by hand to the underground pipe. Moreover, the time consumed in making test lead installations is reduced to about ten percent of that previously required for average installations, and to less than ten percent for attaching leads to unusually deep pipe lines.

My invention will be better understood from the following description taken in connection with the accompanying drawings, and its scope will be pointed out in the appended claims.

In the drawings Fig. 1 is a sectional elevation showing a buried pipe to which a drilled hole has just been made by a hand auger which is shown in place within the hole; Fig. 2 is a similar sectional view showing the casing in the bored hole with wedges securing it against the earth formation around the bore, and with a lightweight hand auger therein with its bladed end at the bottom of the casing; Fig. 3 is a sectional view identical to that of Fig. 2 except that the cleaning apparatus is shown in position for operation in the casing, in place of the auger; Fig. 4 is another view similar to that of Fig. 2 but in which the welding device is shown in place above the cleaned surface of the pipe; Fig. 4A is an elevation of the welding device of Fig. 4 illustrating a modified form of my invention; Fig. 5 is a sectional view of the hole and pipe showing the completed test installation prior to back-filling the bored hole with dirt; Fig. 6 is a representation of a typical drilled hole to an underground pipe in contrast with a typical bell-type excavation; Fig. 7 is a graphic representation of the amount of dirt which must be removed by my present method as compared to conventional methods for holes varying in depth from one to ten feet; Fig. 8 is an elevation of a preferred form of a cleaning apparatus; Fig. 9 is a sectional view along the lines 9—9 of Fig. 8; Fig. 10 is a sectional view along the lines 10—10 of Fig. 8; Fig. 11 is a sectional view along the lines 11—11 of Fig. 8; Fig. 12 is an elevation along the lines 12—12 of Fig. 8; Fig. 13 is a sectional elevation of a preferred form of welding device for use in attaching test leads to underground objects; Fig. 14 is a section taken along the lines 14—14 of Fig. 13; and Fig. 15 is a section taken along the lines 15—15 of Fig. 13.

Referring now to Fig. 1 of the drawings, there is illustrated a pipe 1 to which a hole or bore 2 has been drilled from ground level 3 as the first step of my method. The standard manually operated bucket auger 4 which is shown has proved to be entirely satisfactory for such use, with six inch and smaller sizes being preferred for holes of average depth. As shown in Figs. 6 and 7, the amount of dirt necessarily removed varies in proportion to that removed by customary excavation methods from about 1/50 at a depth of two and one half feet to about 1/250 at a depth of about 10 feet. These ratios, moreover, increase if a smaller auger than a six inch one is used.

The next step, in my method of attaching test leads to buried objects, as shown in Fig. 2, is the insertion of a tubular casing 5, necessarily of smaller outside diameter than the hole 2, into position with its lower end either resting upon the buried member or closely adjacent to a surface thereof. In order better to be used as a guiding and positioning device, the casing should be maintained in a fixed position relative to the pipe and the earth formation; to this end I provide wedges 6, which may be merely blocks of wood, between the wall of the earth surrounding the hole 2 and the outer surface of the casing 5. While the casing is customarily secured in place in the center of the hole, it may be desirable to put it as far to one side thereof as possible when the drilling has not been exact enough to hit the center of the upper surface of the pipe. Consequently, when the casing is, for example, three inches in diameter and is placed within a six inch diameter hole, considerable latitude is allowed for correction of drilling error by placing the casing's lower end as near as possible to the desired portion of the surface of the pipe. Moreover, other means of minimizing the effect of failure to drill the hole in the exact center of the pipe are provided in connection with the operation of my preferred form of cleaning apparatus, as presently described.

Although not always necessary it is usually desirable to remove any residual dirt above the pipe after the casing is put in place. I may use a lightweight auger 7 with thin metal substantially horizontal blades of a diameter only slightly smaller than the inside of the casing. This is a simple manual or motorized operation which takes very little time, and is highly effective in removal of loose material.

The next step is the preparation of a suitable surface on the pipe so that the electrical conductor can be readily attached to it. It is important to predetermine the precise location of the prepared surface relative to the open lower end of the casing so that remote control welding can be successfully carried out. Although any suitable end grinder or end cutter having a supporting frame of sufficient length and shape for insertion into a relatively small diameter casing can be used, I prefer to use my novel and improved cleaning apparatus 8 as shown in Figs. 3, 8, 9, 10, 11 and 12. The apparatus 8 is lowered in the casing 5 until a milling cutter or equivalent device 9, fixed to a shaft 10 at its lower end, makes contact with the surface of the pipe 1.

Referring to Figs. 3 and 8 the milling cutter 9 is rotatably driven along with a sprocket wheel 11, also fixed to the shaft 10, by suitable means such as a chain 12 passing over the sprocket wheel 11 and at its upper end, a sprocket wheel 13. The cleaning apparatus is provided with an elongated frame 14 of a length greater than that of the casing with which it is adapted to be used, and the shaft 10 for the cutter is journaled within bearings 15 and 16, as shown in Fig. 11, formed respectively in the lower end of the frame proper and in an arm member 17 attached thereto. As best shown in Fig. 10 the frame is T shaped, to add rigidity, over the major portion of its length and the drive chain passes respectively on opposite sides of the central portion of the T to form a complete loop. The upper sprocket wheel 13 is fixed to a shaft 18 to which is shown attached a crank 19 by which the cutter 9 can be manually rotated. The shaft 18 is journaled in the frame 14 as best shown in Figs. 8 and 9 with bearings 20 and 21 located respectively in the main rear portion of the frame and in a journal block 22 attached to the frame.

As previously explained it is important to clean the upper surface of the pipe at a predetermined spot relative to the lower end of the casing to insure that the welding device will deposit metal on a surface that has been prepared for it. To this end I provide positioning devices which are shown in Figs. 3, 8 and 10 in the form of collars 23 and 24 having an outside diameter just slightly smaller than the inside diameter of the casing with which the apparatus is adapted to be used. These positioning devices 23 and 24 are identical and are securely fixed to the supporting frame 14 of the cutting apparatus; they are provided with openings 25 and 26, respectively, through which the frame 14 passes, and are each provided with openings 27 and 28 through which the drive chain 12 passes. Since the casing 5 is fixed relative to the earth, and therefore relative to the pipe 1, and since the collars 23 and 24 serve as slidable guide members and centering devices to position the cleaning apparatus 8 within the casing, the cutter 9 will touch the surface of the pipe 1 at a point within a predetermined circle the diameter of which depends upon the eccentricity of the mounting of the cutter relative to the axis through the center of the collars, and on the width of the peripheral cutting surface.

In order to properly clean a portion of the upper surface of the pipe 1, I rotate the frame 14 of the cleaning apparatus 8, simultaneously with the rotation of the cutter, by means of a handle 29 carried by the frame. Naturally, the rotation of the frame 14 does not have to be continuous but it, instead, may be shifted a few degrees at the time between which movements the operator will continue to turn the crank 19 to drive the cutter. In this manner, with the cutter slightly off-center with relation to the axis passing through the respective centers of the positioning collars 23 and 24, which corresponds with the axis of the casing, a substantially circular area is cleaned with a radius approximately equal to the distance from the edge of the cutter farthest from the casing axis to the said axis. For example, if the cutter has a cutting face ⅝ of an inch wide, with ⅛ of an inch on one side of the casing axis and ½ inch on the other side, the radius of the circle cleaned would then be approximately ½ inch. The reason for the slight overlap in the preferred form of my invention is to insure that the entire area within the circumference of the circle is cleaned even when there is excess tolerance between the positioning collars and the casing.

When the boring of the earth hole has not been accurate with the result that the hole reaches the pipe toward its side instead of on approximately the top center, and placing the casing near one edge of the hole fails to completely correct this condition, my cleaning apparatus will nevertheless clean and prepare a sufficiently large area to which the electrical conductor can be welded.

While I have shown a hand operated cleaning apparatus, it will be understood that this device may be motorized and that a rotatable grinder would be fully equivalent to the milling cutter shown and could be substituted therefor. Moreover conventional end cutters or grinders having flat cutting or grinding surfaces could be employed in the practice of my method.

After the appropriate portion of the surface of the pipe 1 has been suitably cleaned or prepared as a welding surface the cleaning apparatus 8 is removed from the casing 5 and in its place is inserted a welding device 30. Since copper wire is commonly used in conductors a brazing process may be more suitable for attaching such conductors to pipes. Consequently, the term welding and welding device is used throughout this description in its broad sense of including both ferrous and non-ferrous fusing, including brazing and hard soldering. The welding or brazing device 30 has a maximum outer diameter just slightly less than the inner diameter of the casing in which it is adapted to be used. This maximum diameter is at the central part of the welding body 31, which is usually referred to as the mold, which body includes an upper threaded portion 32 for housing the ignition assembly and a lower tapered portion 33 on which is formed at its lower end a nose portion 34. The body 31 is provided with substantially vertical grooves 35 and 36 on its opposite sides and with a circumferential groove 37. Aligned with the lower end of the grooves 35 and 36 is a notch 38 in the nose of the welding body. The grooves 35 and 36 and the notch 38 are adapted to receive an insulated electrical conductor 39. At least a portion 40 of the conductor which fits in the notch 38 must be uninsulated though the remaining portion fitted in the grooves 35 and 36 may be either insulated or bare. The conductor 39 is held in place on the welding body by a band 41, such as an ordinary rubber band, in the circumferential groove 37. The mold 31 is preferably made of carbon or similar material, to which the weld metal will not adhere after fusion, so that the welding device can be readily withdrawn from the casing after the test lead is attached.

While the specific details of the construction of the welding device shown in Figs. 13, 14 and 15 will be described, since they constitute an improved and presently preferred welding apparatus, my method of attaching test leads to underground pipes can be performed with any suitable welding structure in which provisions have been made to accurately position it within the casing, to lower it into position directly above the cleaned portion of the pipe, and to operate it from the surface of the ground to cause a deposit of molten metal to be made at a predetermined point relative to the axis of the casing. If the conductor 39 is releasably attached to and carried by the welding device it is therefore assured of proper positioning prior to making the weld. Any other suitable means, however, of placing one end of the conductor just above and adjacent the cleaned or prepared portion of the surface of the pipe and maintaining it in such position until the welding device is lowered into place and operated, would be equally suitable in carrying out my improved method.

Because of its peculiar adaptability for use with my method I have shown in Figs. 13, 14 and 15 the detailed construction of a welding device which constitutes a new and improved apparatus for this purpose. Within the carbon body portion 31 is formed a chamber 42 open at its top end. A passageway 43 is provided communicating between the chamber 42 and the bottom of the nose portion 34. The passage 43 may be provided with an outwardly tapered molding space 44 to better distribute the molten metal when allowed to flow in the manner presently explained. The passageway 43 is closed at its upper end by a fusible disk 45 which serves to hold within the chamber a welding compound 46 until such compound is ignited. Preferably this welding compound is of the exothermic reaction type and may be a suitable mixture of iron oxide and aluminum or of copper oxide and aluminum or it may consist of any of the other powdered welding compounds commercially available in which an exothermic or equivalent reaction takes place upon ignition of the mixture. As previously explained, however, other well known brazing techniques operable from a remote point could be employed without departing from the true scope of my invention.

Although any suitable ignition means, such as a spark, may be used, I have shown by way of example a hot wire ignition system comprising an electric resistance conductor 47, electric terminals 48 and 49 connected thereto, secondary terminals 50 and 51, and electrical leads 52 and 53 extending respectively to the ground level above the casing. When a voltage is applied, for example, from a storage battery, the resistance conductor 47 heats and ignites the welding compound 46. The reaction which takes place in the well known manner melts the metal portion of the welding compound. The heat generated melts the fusible disk 45, and deposits molten metal through the passage 43 into the tapered molding space 44 both on the bare portion 40 of the conductor 39 and on the cleaned area of the pipe or other buried object. Both to protect the ignition lead wires 52 and 53 and provide a means of inserting and withdrawing the welding device 30, I have provided a pipe 54 in which the leads are housed and which extends from the top of the welding device 30 to the top of the casing in which it is adapted for use. I also provide suitable terminal blocks 55 and 56 for the terminals 48 and 49 and 50 and 51 respectively. I further provide a collar 57 which is screwed on the threaded portion 32 of the body 31. A standard bushing 58 is threaded into the upper portion of the collar 57 to provide a means of securing in place the ignition assembly, to close the top part of the ignition chamber and to provide an attachment for pipe 54.

The purpose of the band 41 in groove 37 is to hold in place the conductor 39 during the lowering of the welding device and during the welding operation. The band 41 will not hinder the sliding of conductor 39 in groove 35 when welding device 30 is withdrawn after the conductor 39 has been welded to the pipe.

Referring now to Fig. 5 there is shown the conductor 39 attached to the pipe 1 by means of a weld 59 after the welding device 30 and the casing 5 have both been removed from the hole. The upper end of the test lead is now ready for use in making tests. The weld 59 may be suitably coated with a corrosion-resistant material and then the hole 2 back filled with dirt or otherwise closed.

In the event water is encountered when the hole is dug the method can be carried out as described, with the light auger used to remove residual solid matter, and the grinder or cutter used to remove the covering or coating and the corrosion scale from the pipe. It would be desirable, however, that the welding device be covered by a protective fusible envelope such as a thermosetting plastic bag 60, as shown in Fig. 4A, before it is lowered into place. The heat of the exothermic reaction will drive the water from beneath the nose 38 at the time of welding so that satisfactory attachment of the conductor 39 to the pipe 1 can be made. The bag 60 fits loosely around the welding device 30 so that the conductor 39 may still fit within the grooves 35 and 36, although on the outside of the bag, and be held in place by the rubber band 41. It is preferably sealed at its upper end and secured to the pipe 54 by the tape 61, or other suitable securing and sealing means. Of course, the lower end of the conductor 39 may be placed within the bag 60 with substantially the same results.

While I have shown particular embodiments of my invention, it will be understood, of course, that I do not wish to be limited thereto since many modifications may be made; and I therefore contemplate by the appended claims to cover any such modifications as fall within the true spirit and scope of my invention.

What I claim as new and desire to secure by Letters Patent of the United States is:

1. A method of attaching an electrical conductor to a buried metal object by excavating from ground level to said object, placing a cylindrical casing of uniform diameter in substantially vertical position with its lower end directly above said object and its upper end extending to ground level, lowering a milling cutter and its supporting frame into said casing, simultaneously rotating said milling cutter and said frame while said cutter is in contact with said buried object to cut a substantially circular flat on the surface of said object concentric with the longitudinal axis of said casing, placing one end of an electrical conductor on the circular flat on said pipe, lowering a container of fusible material of substantially the same diameter as said casing into position directly above said circular flat, and depositing from said container molten metal to secure and electrically connect said conductor to said buried object.

2. The method according to claim 1 in which the container of material is covered with a readily fusible substantially water-tight envelope before being inserted into the casing.

3. A method of attaching an electrical conductor to a buried metal pipe by boring from the earth's surface to the upper peripheral surface of said pipe, setting on said pipe a cylindrical casing of uniform diameter and of sufficient length to extend to the earth's surface, driving wedges between said casing and the earth formation surrounding the bore, removing residual foreign matter from within said casing, lowering into contact with said peripheral surface of said pipe a cleaning wheel having a supporting frame closely guided by and slidable in said frame, simultaneously rotating said cleaning wheel and its supporting frame to clean a circular flat on the surface of said pipe substantially concentric with the longitudinal axis of said casing, placing a portion of said electrical conductor above and adjacent the circular flat on said pipe, lowering a welding head of substantially the same diameter as said casing into position directly above said circular flat, and depositing from said welding head molten metal to secure and electrically connect said conductor to said pipe.

4. A method of attaching a test lead to a buried metal pipe for making electrical instrument readings, by drilling the earth from ground level to said pipe to form a bore of small diameter relative to its depth, cleaning an area of the surface of said pipe directly below the lower end of said bore, dropping one end of said test lead into said bore to a position directly above said cleaned area, lowering and guiding a welding head into said bore to a position directly above said cleaned area, and supplying molten metal through the lower end of said welding head to secure and electrically connect said test lead to said pipe.

References Cited in the file of this patent

UNITED STATES PATENTS

| | | |
|---|---|---|
| 815,043 | Scheer | Mar. 13, 1906 |
| 876,539 | Garver | Jan. 14, 1908 |
| 921,569 | Tupes | May 11, 1909 |
| 1,891,209 | Smith | Dec. 13, 1932 |
| 2,192,904 | Ferris | Mar. 12, 1940 |
| 2,447,085 | Odlum | Aug. 17, 1948 |
| 2,526,132 | Hartman | Oct. 17, 1950 |
| 2,528,040 | Crouch | Oct. 31, 1950 |
| 2,564,337 | Maddex | Aug. 14, 1951 |